March 30, 1937. A. C. STRAND 2,075,784
WASTE WATER HEAT RECOVERY APPARATUS
Filed Feb. 24, 1936
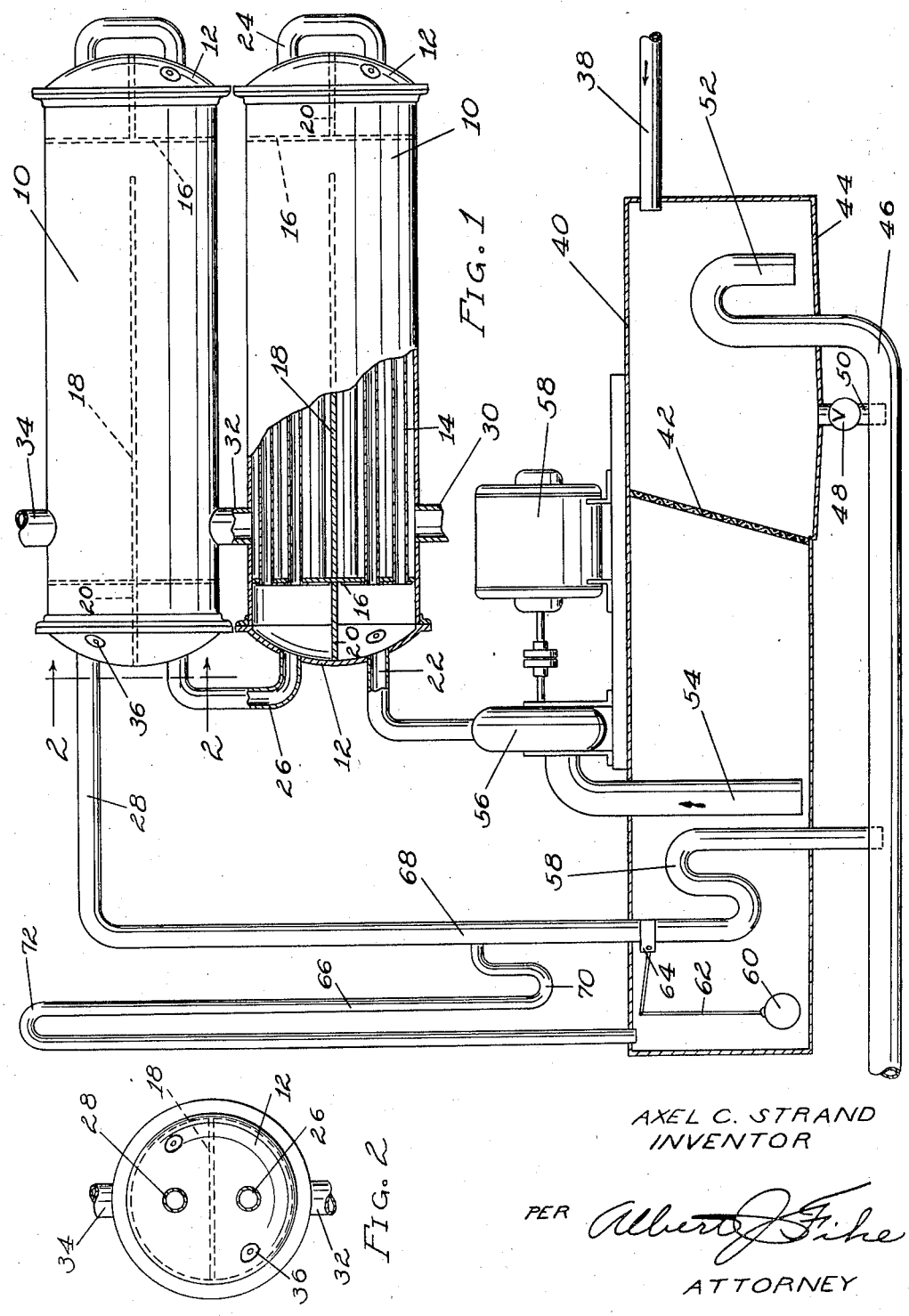
AXEL C. STRAND
INVENTOR
PER *Albert J. Fike*
ATTORNEY Patented Mar. 30, 1937

2,075,784

UNITED STATES PATENT OFFICE 2,075,784

WASTE WATER HEAT RECOVERY APPARATUS

Axel C. Strand, Chicago, Ill.

Application February 24, 1936, Serial No. 65,253

6 Claims. (Cl. 257—191)

This invention relates to an improved waste water heat recovery apparatus, and the present application constitutes an improvement over my invention along similar lines which is patented in the United States under Number 1,967,136 dated July 17, 1934, and for which a further application for patent is pending, Serial No. 55,083, filed December 18, 1935.

One of the main objects of the present invention is to include a complete heat recovery apparatus for waste water, particularly applicable to laundries or the like or in any commercial apparatus where considerable amounts of heated water are ordinarily allowed to go to waste.

One of the important objects of this invention is to provide an improved form of heat transfer apparatus.

Another object is the provision of a complete circulating system which can be installed as a unit in a laundry or in any other commercial or similar plant for the recovery of heat from waste water or other fluids.

Still another important object of the invention is to provide means, particularly applicable to more or less dirty waste water, wherein a considerable amount of the solids will be removed therefrom before the heat transfer action takes place.

A further and additionally important object of the invention is the provision in an installation of this type of a safety means whereby to automatically compensate for irregularities in the flow of waste water.

Other and further important objects of the invention will be apparent from the disclosures in the accompanying drawing and following specification.

The invention, in a preferred form, is illustrated in the drawing and hereinafter more fully described.

In the drawing:

Figure 1 is an elevational view, partly in section and partly broken away, showing the improved waste water heat recovery apparatus of this invention together with its various appurtenances, traps, valves and the like.

Figure 2 is an end view taken on the line 2—2 of Figure 1, looking in the direction indicated by the arrows.

As shown in the drawing:

The reference numeral 10 indicates generally one of the improved heat transfer tanks of this invention, two being shown, but it will be obvious that one or in fact any number may be employed as desired.

Each tank comprises essentially a pair of semi-cylindrical ends 12 which are bolted or otherwise affixed to the cylindrical body of the tank, and inside each body is a plurality of longitudinally extending pipes 14 open at their ends and fitted in a usual tube plate 16.

A baffle plate 18 is associated with the tubes or pipes 14 extending longitudinally of the tank and at a point half way between the top and bottom thereof, thereby separating the tank into two compartments. It will be noted that each baffle plate is connected to one header 16 but terminates somewhat short of the opposed header. Continuations 20 of the baffle plates 18 extend into the end structures as shown, and these continuations 20 actually divide the end structures into two zones, whereby warm water flowing into one of the heat exchangers 10 from an intake pipe 22 will be constrained to move through the lower set of tubes or pipes 14, and thence through an extension pipe 24 at the other end of the tank, and again in a reverse direction through the upper portion of the tank into an outlet pipe 26 which, in turn, can lead into a further tank or tanks, finally terminating in a discharge pipe or the like 28.

The cold water to be warmed is introduced into the exchangers by inlet pipes 30 at the bottom thereof, and flows upwardly around the longitudinally extending tubes 14 up to the level of the baffle plate 18, whence it is constrained to flow around the end of the baffle plate and thence to the upper portion of each tank or heat exchanger and outwardly through a discharge pipe 32, which, in turn, may lead to another tank or tanks and finally into an outlet 34.

It will be noted that the coldest intake water is subjected to the action of the warmest waste water.

Hand holds or clean-out plugs 36 are provided in the tank ends for the removal of any accumulated waste or like material which might otherwise clog the apparatus.

The warm waste water enters the system through a pipe 38 and is originally introduced into the tank or reservoir 40 divided into two chambers by means of a screen or the like 42, whereby most of the solid material is retained and allowed to accumulate on the sloping floor 44 of this portion of the chamber, whence it can be directly discharged into a sewer line 46 by means of a valve 48 in a pipe connection 50.

It will be noted that the sewer line enters the chamber 40 with a return bend 52 which provides a trap for preventing the escape of sewer gas and also produces a safety overflow construction, as the water in the chamber cannot rise above the level of the bend 52.

At the other end of the reservoir 40, there is provided a suction pipe 54 which leads to a pump 56 operated by a motor 58 whereby the warm waste water is delivered directly into the heat exchange tanks 10 through the pipe 22.

After the water has been forced through the system and all available heat extracted therefrom, it returns by means of a pipe 28 to the reservoir 40, and it will be noted that this pipe 28 extends into and through the reservoir, having a trap bend 58 incorporated thereinto, which bend is in the reservoir, and then finally the pipe passes out of the reservoir and connects directly to the sewer pipe 46. The return bend 58 provides a trap to insure against the undesired entrance of any sewer gas into the system, and a float 60 is provided which, through a supporting lever 62, operates a valve positioned in a housing 64 on the pipe 28, whereby discharge of water through the pipe 28 will be automatically stopped when the water in the reservoir 40 drops below a certain predetermined level which, in this instance, is a little bit above the lower end of the intake pipe 54 which leads to the pump 56. When the valve in this pipe 28 is closed, the water in the system will not be allowed to escape into the sewer, but will be forced through an auxiliary pipe 66 which is connected to the pipe 28 at the point 68 and which also has a trap 70 therein. The pipe 66 is U-shaped as shown and has its upper end 72 slightly above the highest point of the entire system so as to insure suitable operation, and the lower end of this pipe discharges directly into the reservoir 40. It will be obvious that if an insufficient supply of warm water is delivered to the chamber 40 through the pipe 38 and the level falls to a point approximating that at which the suction or vacuum in the pipe 54 may be broken, the valve at 64 is automatically closed and any water in the system, instead of being discharged to the sewer, is maintained therein by means of the auxiliary pipe 66, thereby eliminating any delay which might be occasioned because of an insufficient supply of water to maintain suction in the pumping system.

It will be evident that herein is provided a heat exchanging apparatus which is particularly adaptable for any commercial operation wherein considerable amounts of water are used, which water must be warmed and which cannot be used over on account of impurities accumulated therein during the particular operation such as occurs in laundries or perhaps in various chemical processes. The saving of fuel effected by the use of an installation of this type will soon return the original cost of the apparatus and assure satisfactory future savings in operation.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In a waste water heat recovery system, a reservoir for warm water, an overflow connection therein leading to a sewer, a discharg pipe in the reservoir, a pump connected to the discharge pipe, heat exchangers beyond the pump, and a return pipe from the heat exchangers back to and passing through the reservoir, and a connection from said return pipe to a sewer, together with a further valved connection from the reservoir to a sewer.

2. In a waste water heat recovery system, a reservoir for warm water, an overflow connection therein leading to a sewer, a discharge pipe in the reservoir, a pump connected to the discharge pipe, heat exchangers beyond the pump, and a return pipe from the heat exchangers back to and passing through the reservoir, and a connection from said return pipe to a sewer, together with a further valved connection from the reservoir to a sewer, and a screen in the reservoir dividing the same into two chambers.

3. In a waste water heat recovery system, a reservoir for warm water, an overflow connection therein leading to a sewer, a discharge pipe in the reservoir, a pump connected to the discharge pipe, heat exchangers beyond the pump, and a return pipe from the heat exchangers back to and passing through the reservoir, and a connection from said return pipe to a sewer, together with a further valved connection from the reservoir to a sewer, and a screen in the reservoir dividing the same into two chambers, the valved sewer connection being in the first chamber, said first chamber being provided with a sloping floor for sediment collection and drainage.

4. In a waste water heat recovery system, a reservoir for warm water, an overflow connection therein leading to a sewer, a discharge pipe in the reservoir, a pump connected to the discharge pipe, heat exchangers beyond the pump, a further valved connection from the reservoir to a sewer, and a screen in the reservoir dividing the same into two chambers, the valved sewer connection being in the first chamber, said first chamber being provided with a sloping floor for sediment collection and drainage, and a final discharge pipe leading from the heat exchangers passing through the second chamber to a sewer and with a trap bend therein.

5. In a waste water heat recovery system, a reservoir for warm water, an overflow connection therein leading to a sewer, a discharge pipe in the reservoir, a pump connected to the discharge pipe, heat exchangers beyond the pump, and a return pipe from the heat exchangers back to and passing through the reservoir, together with a float in the reservoir, a valve in the return pipe actuated by the float and an escape pipe connected to the return pipe.

6. In a waste water heat recovery system, a reservoir for warm water, an overflow connection therein leading to a sewer, a discharge pipe in the reservoir, a pump connected to the discharge pipe, heat exchangers beyond the pump, and a return pipe from the heat exchangers back to and passing through the reservoir, together with a float in the reservoir, and a valve in the discharge pipe actuated by the float, and an auxiliary outlet pipe connected to the discharge pipe beyond the float valve, said auxiliary discharge pipe leading back to the reservoir.

AXEL C. STRAND.